(12) United States Patent
Renzzulla et al.

(10) Patent No.: US 6,820,451 B2
(45) Date of Patent: Nov. 23, 2004

(54) SWEEP FORMING ASSEMBLY AND METHOD

(75) Inventors: Edward Renzzulla, Lake City, TN (US); Darrell A. Bechtel, Hanover, PA (US); Samuel Harman, Taneytown, MO (US)

(73) Assignee: Magna International Inc., Ontario (CA)

( * ) Notice: Subject to any disclaimer, the term of this patent is extended or adjusted under 35 U.S.C. 154(b) by 0 days.

(21) Appl. No.: 10/169,994

(22) PCT Filed: Jan. 8, 2001

(86) PCT No.: PCT/CA01/00026
§ 371 (c)(1),
(2), (4) Date: Sep. 23, 2002

(87) PCT Pub. No.: WO01/51228
PCT Pub. Date: Jul. 19, 2001

(65) Prior Publication Data
US 2003/0038489 A1 Feb. 27, 2003

Related U.S. Application Data
(60) Provisional application No. 60/176,010, filed on Jan. 14, 2000.

(51) Int. Cl.[7] ................................................. B21D 5/08
(52) U.S. Cl. ....................................................... 72/173
(58) Field of Search .......................... 72/173, 171, 170

(56) References Cited

U.S. PATENT DOCUMENTS

| | | | | |
|---|---|---|---|---|
| 1,862,626 A | * | 6/1932 | Lindh | 72/146 |
| 1,874,280 A | * | 8/1932 | Gibbons | 72/146 |
| 2,279,197 A | * | 4/1942 | Hoell | 72/171 |
| 2,410,298 A | * | 10/1946 | Mirel | 72/14.6 |
| 4,354,372 A | | 10/1982 | Inoue et al. | |
| 4,530,226 A | | 7/1985 | Granzow et al. | |
| 4,910,984 A | * | 3/1990 | Young et al. | 72/14.7 |
| 5,813,594 A | | 9/1998 | Sturrus | |

FOREIGN PATENT DOCUMENTS

JP  59150619  8/1984

* cited by examiner

Primary Examiner—Daniel C. Crane
(74) Attorney, Agent, or Firm—Pillsbury Winthrop LLP (57) ABSTRACT

A method and apparatus produces a roll formed bumper member comprising of a metal material. The bumper member has a predetermined transverse cross section and a predetermined curvature. A strip bumper structure is fed into a forming assembly along a line level. The bumper structure has the predetermined transverse cross section and an essentially straight longitudinal configuration. The forming assembly has a driven support roller and a pair of driven cooperating flexing rollers. A first roller of the pair of flexing rollers is positioned to deflect the bumper structure out of the line level. A second roller of the pair of flexing rollers is mounted to revolve about the first roller. The support roller and the pair of cooperating flexing rollers are driven for feeding the bumper structure between the pair of cooperating and counter rotating flexing rollers. Revolving the second flexing roller about the first flexing roller flexes the bumper structure between the support roller and the first flexing roller imparting a permanent longitudinal curvature to the bumper structure.

10 Claims, 9 Drawing Sheets

SWEEP FORMING ASSEMBLY AND METHOD

This application is the National Phase of International Application PCT/CA01/00026 filed Jan. 8, 2001 which designated the U.S. This application is also based on U.S. Provisional Application Ser. No. 60/176,010, filed on Jan. 14, 2000, the entire contents of which are hereby incorporated herein reference thereto.

FIELD OF THE INVENTION

The present invention relates to vehicle bumpers and methods for producing the same.

BACKGROUND OF THE INVENTION

Motor vehicles are typically provided with front and rear bumpers to protect the vehicle in the event of impact. Vehicle bumpers are typically formed from a strip of sheet steel that is shaped by roll forming in a roll forming assembly to have a predetermined transverse cross section that rigidifies the bumper and resists deformation during impact. Bumpers are also provided with a predetermined curvature in the longitudinal direction to provide a bumper that conforms to the shape of the vehicle in the "cross car" or side-to-side direction.

The degree of longitudinal curvature of the bumper is referred to as bumper "sweep" in the industry. The degree of bumper sweep is a general measure of the radius of curvature of the bumper. A basic commercial quantitative description of bumper sweep is obtained by measuring a chord length of 60 inches (1.524 m) along the bumper and determining the maximum distance between the bumper and the chord along a line perpendicular to the chord. The distance is measured in inches (centimeters) and converted to a sweep number by determining the number of eighths of an inch (0.3175 cm) in the measured distance.

Bumpers in commercial use typically have sweeps of approximately zero (i.e., a substantially straight bumper) up to approximately 50, although bumpers having a sweep as high as 80 are used in vehicle construction.

It is well known that the primary objectives of vehicle parts manufacturers is to produce high strength bumpers that resist deformation during impact, but that are also relatively light weight. The goal of minimizing weight can be achieved by reducing the thickness or gauge of the bumper, thereby using less metal to construct the bumper. Minimizing vehicle weight is important because lighter weight vehicles are easier to transport prior to sale and are more fuel efficient for the vehicle owner. The manufacturer can reduce metal thickness and still meet safety requirements by using higher strength steel to construct the bumper.

The type of metal used for bumper construction is thus a major determinant of bumper weight. Most commercial bumpers, however, are constructed of relatively mild grades of steel because mild steel grades are easier for the parts manufacturer to sweep form during manufacture. High strength low alloy (HSLA) grade steel is an example of such a grade of steel widely used commercially for bumper construction.

HSLA steel is available in grades having a KSI minimum yield strength of from 35 up to 80 (i.e., a MPa minimum yield strength of from 240 to 550). Grades of steel above HSLA are also commercially available, including dual phase and martinsitic grades of steel, but most parts manufacturers are generally not able to produce a satisfactory commercial bumper with a significant degree of bumper sweep using these higher steel grades.

Martinsitic steel having a tensile strength of up to 220 KSI (1516 MPa) is commercially available. Generally, any steel having a KSI greater than 80 (240 MPa) can be considered an ultra high strength steel. The rigidity and structural strength provided to the bumper by the transverse cross section makes the sweeping process difficult and limits the strength of the steel most manufacturers can use to construct the bumper.

More particularly, during manufacturing, a strip of sheet steel is roll formed in a series of pairs of roll forming rollers that gradually shape the steel in a transverse direction to provide the predetermined transverse bumper cross section. An initially shaped bumper structure emerges from a position of exit of the roll forming assembly as an elongated, longitudinally straight, continuous structure. Typically, the initially formed bumper structure is provided with the desired degree of longitudinal curvature (the terms "bumper sweep" and "longitudinal curvature" are used interchangeably in the present application) immediately after the roll forming operation in a separate sweep forming assembly positioned at the position of exit of the roll forming assembly.

The initially shaped bumper structure emerges from the sweep forming assembly as a finally shaped continuous bumper structure. By "finally shaped" it is meant that the desired degree permanent curvature has been imparted to the bumper structure in both the transverse and longitudinal directions so that the bumper structure has the predetermined transverse bumper cross section and the predetermined longitudinal curvature. The finally shaped bumper structure is then fed into a cutting assembly positioned immediately downstream of the sweep forming assembly. The cutting assembly cuts the finally shaped bumper structure into individual bumper members of predetermined length, each bumper member thus having the predetermined transverse bumper cross section and the predetermined longitudinal curvature.

Known prior art sweep forming assemblies are not commercially usable to provide a wide range of bumper sweep when high strength steel is used to construct the bumper because they use either what is effectively a form of extrusion or a bending operation to impart bumper sweep. One prior art method, for example, of providing bumper sweep uses a series of blocks, each block having a central opening that is generally the same size and shape as the transverse cross section of the bumper structure. The series of blocks is positioned so that the initially shaped bumper structure passes through the openings as it moves out of the roll forming assembly in the downstream direction. Selected blocks are raised so that the path formed by the openings is not straight, thereby requiring the bumper structure to deform in the longitudinal direction as it is forced through the openings. A degree of permanent curvature is thereby imparted to the bumper structure.

This method is, in effect, a form of extrusion and has several disadvantages. The metal-to-metal sliding engagement between the bumper structure and the sides of the openings in the blocks wears the metal of the bumper structure and the metal of the blocks. The metal-to-metal sliding engagement limits the speed at which the bumper structure can pass through the assembly line and thus limits the production capacity of a manufacturing plant. This method will provide only a limited degree of sweep and is not commercially feasible for high strength steel bumper manufacturing.

Another sweep forming assembly which has been used commercially in the past several years utilizes a series of longitudinally spaced movable upper rollers and a series of longitudinally spaced fixed lower rollers that cooperate to bend the bumper structure after it is roll formed. The lower rollers are disposed below the advancing bumper structure and support the same. The upper rollers are disposed above the advancing bumper structure and are vertically movable. The rollers are arranged so that one upper roller is vertically centered between two lower rollers. The sweep is imparted by moving the upper rollers vertically downwardly into engagement with an upper surface of the advancing initially shaped bumper structure. The upper rollers exert a downward force on the bumper structure sufficient to bend the bumper structure between an associated pair of lower fixed rollers, thereby imparting a degree of sweep to the bumper structure.

The method performed by this assembly is not effective when harder grades of steel are used in bumper structure construction because hard steel grades require forces of great magnitude to bend the steel. These high magnitude bending forces are undesirable because when a force of sufficient magnitude to bend the hard steel is applied by the upper rollers, the upper rollers tend to permanently deform the predetermined bumper cross section of the bumper structure. More particularly, the vertical sides of a hard steel bumper structure tend to pucker uncontrollably, crease or tear under the bending force of the upper rollers. Bending operations also do not provide uniform longitudinal bumper curvature when harder grades of steel are used.

Another sweep forming assembly that bends the advancing bumper structure to impart bumper sweep is disclosed in U.S. Pat. No. 4,530,226. The '226 sweep forming assembly includes three forming stations mounted on a base assembly positioned at the end of a roll forming assembly. Each station includes a pair of cooperating forming rolls. The middle station also includes an idler roller longitudinally spaced from the pair of forming rolls. The bumper in the '226 assembly is permanently deformed to introduce a bumper structure primarily by the interaction of the rollers in the middle station. The first and third stations primarily guide the bumper structure through the middle station.

The pair of forming rollers and the idler roller of the middle station of the '226 assembly are longitudinally spaced and transversely off-set from one another (where "transversely" is defined with respect to the bumper structure and refers to a direction perpendicular to the longitudinal extent thereof) to permanently deform the elongated bumper structure in the transverse direction. Specifically, the pair of forming rollers drive the bumper structure over the transversely offset single idler roller which is fixedly mounted on the middle station downstream of the paired forming rollers thereof. The paired forming rollers of each of the three stations are positioned so that the center line of each forming station (i.e., a line between the axes of rotation of each pair of forming rollers) is maintained in a generally perpendicular relationship with the tangential path of the bumper structure as it passes longitudinally through the three forming stations. Thus, opposing transversely directed forces are applied to the bumper structure between the paired rollers of the middle station and the idler roller of the middle station of the '226 assembly which bend the portion of the bumper structure therebetween to impart sweep. The '226 assembly utilizes opposing transversely directed forces applied to the bumper structure at longitudinally spaced positions to create a bending force applied along the portion of the bumper structure between the forming rollers of the middle station and the idler roller of the middle station to impart sweep. Thus, the '226 assembly can impart only a limited degree of sweep and is not suited to providing sweep in high strength metals such as martinsitic grades of steel. The '226 assembly is used to impart a sweep up to approximately 30 in a bumper constructed of HSLA steel. Other examples of assemblies for sweep forming bumpers are shown in references U.S. Pat. Nos. 4,354,372 and 5,813,594.

It is well known that every metal material has a characteristic modulus of elasticity and that if a metal material such as steel is deformed within its elastic limits by applied forces, the metal material returns to its original shape when the forces are removed. Permanent curvature is only imparted to a metal material if it is deformed beyond its elastic limit. Prior art sweep forming assemblies such as the '226 assembly are unsuccessful at sweep forming high strength steel primarily because they rely on a bending force to deform the steel beyond its elastic limit. A bending force is a force exerted over a substantial length of a bumper structure to impart sweep. In the '226 assembly, the bending force is exerted along the length of the bumper structure between the paired rollers and the idler roller of the middle station. Bending forces are ineffective at imparting large degrees of sweep to bumper structures constructed using high grades of steel because these grades of steel require such a high degree of force to deform beyond their elastic limits that the bumper structure will uncontrollably pucker or tear, rendering the bumper structure unusable.

An individual bumper is primarily intended as a protective structure on the vehicle. Thus, it is essential that the structure of each commercially produced bumper be uniform and that there be no creasing, tearing or uncontrolled puckering of its walls to ensure crashworthiness. It is thus essential that the transverse cross section of each bumper not be deformed during the sweep forming operation. Prior art sweep forming assemblies are not able to reliably impart a high degree of sweep to bumpers constructed of relatively high grades of steel such as dual phase and martinsitic grades. A need exists for a sweep forming assembly that can provide a bumper sweep of up to approximately 80 for roll formed bumpers constructed of high strength steel such as dual phase or fully hardened martinsitic grades of steel having a tensile strength of up to 220 KSI (1516 MPa).

SUMMARY OF THE INVENTION

To meet the need identified above, the present invention provides a method for producing a roll formed bumper comprising of a metal material and having a predetermined transverse cross section and a predetermined curvature. A bumper structure is fed into a forming assembly along a line level. The bumper structure has the predetermined transverse cross section and an essentially straight longitudinal configuration. The forming assembly has a driven support roller and a pair of driven cooperating flexing rollers. A first roller of the pair of flexing rollers is positioned to deflect the bumper structure out of the line level and a second roller of the pair of flexing rollers is mounted to revolve about the first roller. The support roller and the pair of cooperating flexing rollers are driven for feeding the bumper structure between the pair of cooperating and counter rotating flexing rollers. Revolving the second flexing roller about the first flexing roller flexes the bumper structure between the support roller and the first flexing roller imparting a permanent longitudinal curvature to the bumper structure.

Another object of the present invention is to provide a vehicle bumper constructed of a metal material. The metal material is roll formed to provide an elongated bumper structure having a predetermined transverse cross section and a longitudinal extent. The predetermined transverse cross section has one at least partially open side. The longitudinal extent of the bumper structure has a predetermined bumper curvature of about 80 and the metal material has a KSI of at least approximately 120 (an MPa of approximately 827). Preferably the metal material is a steel that has a minimum 0.2 percent offset yield strength of about 120,000 psi (827 MPa) and a ferritic grain structure. More preferably, the metal material is a quenched and tempered steel having a minimum ultimate tensile strength of about 140,000 psi (965 MPa) and a grain structure comprised of ferrite and tempered martinsite. Most preferably, the metal material is a martinsitic steel. A preferred martinsitic steel is a quenched and tempered steel having a minimum ultimate tensile strength of from about 190,000 to about 220,000 psi (from about 1310 MPa to about 1516 MPa) and having an entirely tempered martinsite grain structure. When this preferred martinsitic steel is used, preferably the thickness of the metal material is within the range of approximately 0.8 mm to approximately 1.6 mm and is more preferably within the range of approximately 1.0 mm to approximately 1.3 mm.

Another object of the present invention is to provide an assembly that will carry out the method previously described, by providing a driven support roller positioned to receive a strip bumper structure at a line level. A driven first flexing roller is positioned to deflect the bumper structure from the line level and a driven second flexing roller cooperates with the first flexing roller for counter rotating therewith. The second flexing roller is movably mounted to revolve about the first flexing roller. An adjustment assembly operably engages the second flexing roller to effect the revolving movement of the second flexing roller about the first flexing roller. The revolving movement effects engagement of the second flexing roller with the bumper structure between the support roller and the first flexing roller and urges the bumper structure against both the support roller and the first flexing roller to impart a permanent longitudinal curvature to the bumper structure.

DETAILED DESCRIPTION OF THE PREFERRED EMBODIMENT

Figure 7:
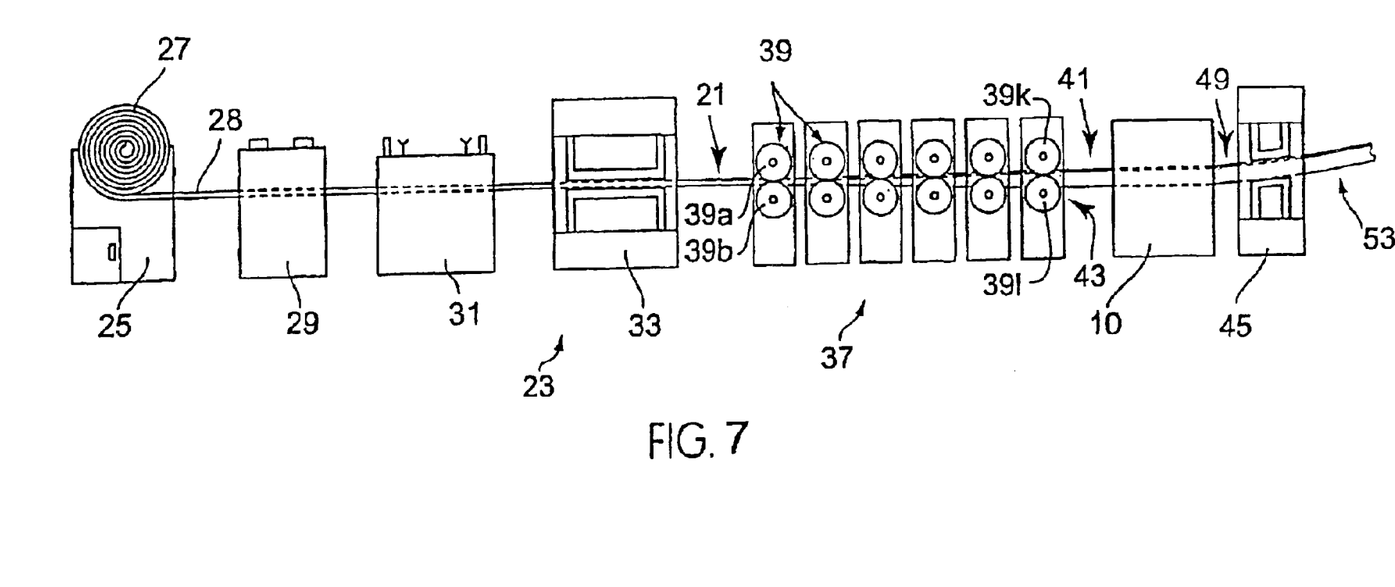
FIG. 7 is a schematic side plan view of an assembly line that includes the sweep forming assembly.

Referring to FIG. 7, the sweep forming assembly 10 is preferably included as part of an assembly line 23 that includes a series of assemblies which cooperate to produce a plurality of individual vehicle bumpers starting from a coiled strip structure of raw metal material. The cooperating assemblies uncoil and progressively shape the strip structure into a continuous metal strip bumper structure and then cut the continuous structure at regular intervals to form individual bumper members.

The assembly line 23 includes an uncoiling assembly 25 that receives and uncoils a roll of a metal strip structure made of a raw metal material. The coiled portion of the metal strip structure is designated 27 and the uncoiled metal strip structure is generally designated 28. The portion of the metal strip structure 28 exiting the uncoiling assembly 25 passes sequentially through a plurality of assemblies including a temper mill assembly 29, a stock straightener assembly 31, an optional pre-pierce press assembly 33 and a roll forming assembly 37.

The uncoiling assembly 25, temper mill assembly 29 and stock straightener assembly 31 uncoil, flatten and condition the metal strip structure 28 so that the portion 21 thereof acted on by these assemblies 25, 29, 31 forms a continuous, essentially flat blank that enters the roll forming assembly 37. The roll forming assembly 37 includes a plurality of pairs of roll forming rollers, generally designated 39, which progressively shape a transverse cross section in a longitudinally extending portion of the blank metal strip structure 28. The portion of the metal strip structure 28 exiting the roll forming assembly 37 has a predetermined transverse bumper cross section and is generally referred to as a strip bumper structure, generally designated 53.

The bumper structure 53 generally includes (a) an initially shaped or formed portion 41 and (b) a initially shaped or formed portion 49. The initially shaped portion 41 has the predetermined roll formed transverse bumper cross sectional configuration and an essentially straight longitudinal configuration at the position of exit 43 of the roll forming assembly 37. Thus, the roll forming assembly 37 provides the continuous longitudinally extending initially shaped bumper structure 41 at the position of exit 43 thereof and the initially shaped bumper structure 41 moves downstream from there into the sweep forming assembly 10.

Preferably, the sweep forming assembly 10 shown schematically in FIG. 7, is positioned on the assembly line 23 immediately downstream of the roll forming assembly 37. The sweep forming assembly 10 receives the initially shaped continuous bumper structure 41 at the position of exit 43 of the roll forming assembly 37 and provides a predetermined longitudinal bumper curvature to the initially shaped bumper structure to give the bumper structure its final form. The predetermined transverse cross section is not changed by the sweep forming assembly 10. The finally formed portion 49 of the continuous bumper structure 53 is fed into a cutoff press assembly 45 that the strip bumper structure 53 into individual bumper members. An exemplary individual bumper member 47 is shown in isolation in FIG. 8.

Preferably, the initially shaped bumper structure entering the sweep forming assembly 10 is roll formed to have a predetermined transverse cross section that includes one at least partially open side. Two exemplary roll formed bumper structures having one at least partially open side are shown in cross section in FIGS. 3 and 4.

Figure 3:
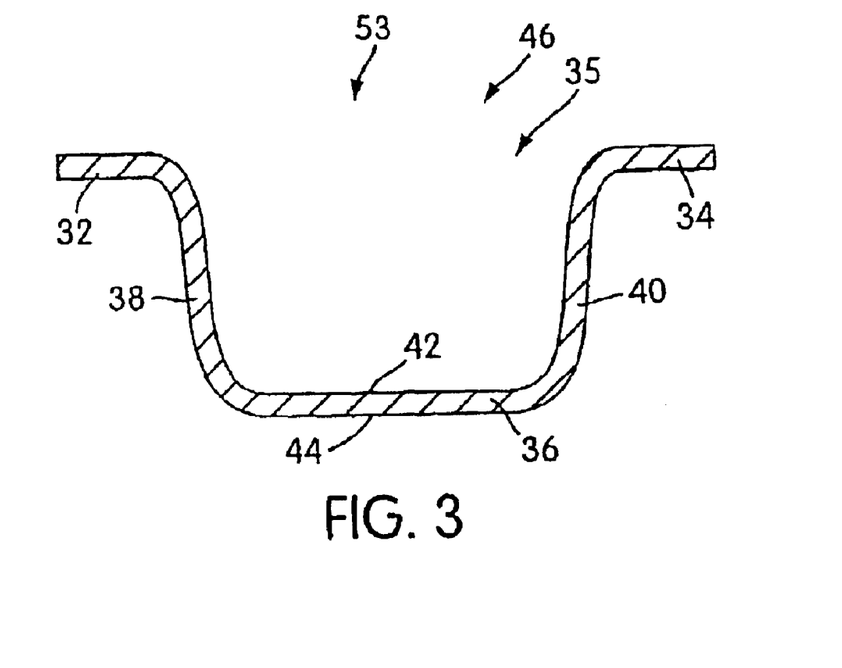
FIG. 3 shows a cross sectional view of the strip bumper structure of FIG. 1 taken through the line 3–3.

FIG. 3 shows the predetermined transverse bumper cross section of the exemplary bumper structure 53 (and of the bumper member 47), which has an open cross section. It can be understood that both the initial shaped and finally shaped portions 41, 49 of the bumper structure 53 (and the bumper member 47) have essentially the same cross section so that the discussion of the cross section applies to all three 41, 47, 49. The bumper structure 53 has transversely outwardly extending wall portions 32, 34 on opposite sides thereof and a roll formed recess 35. The roll formed recess 35 is defined by a central wall portion 36 and side wall portions 38, 40. The central wall portion 36 has an inner surface 42 and an outer surface 44. The recess 35 generally defines an open side 46 of the cross section. The cross section of the bumper structure 53 is referred to as "open" because the opposite transverse wall portions 32, 34 extend generally away from the recess 35 leaving the central recess 35 open.

Figure 4:
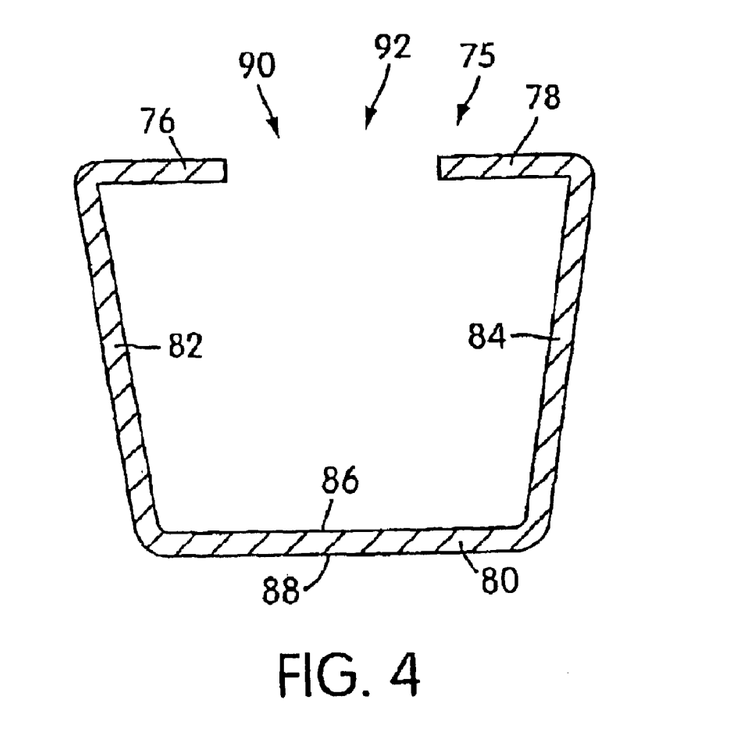
FIG. 4 shows a cross sectional view of the strip bumper structure of FIG. 5 taken through the line 4–4.

FIG. 4 shows an exemplary cross-sectional view of the predetermined cross section of an initially shaped bumper structure 74 of an exemplary bumper structure generally designated 75 that has a partially closed cross section. The bumper structure 75 has transversely inwardly extending wall portions 76, 78, a central wall portion 80 and side wall portions 82, 84. The central wall portion 80 has an inner surface 86 and an outer surface 88. The wall portions 76, 78 extend generally inwardly in spaced overlying relation to the central wall portion 80, thereby partially closing the cross section and providing the cross section with a "C" shape. The bumper structure 75 thus has a partially open side, generally designated 92, that includes an opening 90.

The sweep forming assembly 10 can be advantageously used to provide bumper sweep to either a bumper structure having an open transverse cross section (such as the exemplary bumper structure 53) or to a bumper structure having a partially open cross section (such as exemplary bumper structure 75).

Furthermore, a bumper structure having either an open or partially open cross section can be swept in either of two general directions to provide a finally formed bumper structure that has either an inside sweep or an outside sweep. A finally formed bumper structure is considered to have inside sweep if its radius of curvature is directed outwardly from the inner surface thereof 42 or 86, respectively. The exemplary bumper member 47 shown in FIG. 8 has an inside sweep. Similarly, a finally formed bumper structure is considered to have an outside sweep if its radius of curvature is directed outwardly from the outer surface thereof 44 or 88, respectively.

As will become apparent, the sweep forming assembly 10 of the present invention can be constructed and operated to provide a bumper structure having an open cross section with either an inside or an outside predetermined bumper curvature (i.e., bumper sweep) or to provide a bumper structure having a partially open cross section with either an inside or outside predetermined bumper curvature.

The rollers 39 of a roll forming assembly 37 are spaced to receive the metal strip structure 28 therebetween and that the peripheries of the rollers 39 are constructed to progressively shape the transverse cross section. FIGS. 9–14 show the peripheries of upper and lower roller of the series of pairs of rollers 39 of the toll forming assembly 37. The complementary pairs of rollers are designated 39a and 39b; 39c and 39d; 39e and 39f; 39g and 39h; 39i and 39j; and 39k and 39l. It can be appreciated that when the roll forming assembly 37 is configured to form a strip bumper structure having an open cross section, the outer peripheries of each pair of rollers 39 are generally of complimentary male and female configuration. The pairs of rollers 39 are arranged so that the portion of the strip structure 28 extending through the roll forming assembly 37 is at a constant vertical height. This vertical height is referred to as the "line level" of the roll forming assembly 37. The initially shaped continuous bumper structure 41 (see FIG. 7) emerges from the position of exit 43 of the roll forming assembly 37 at line level.

Figure 1:
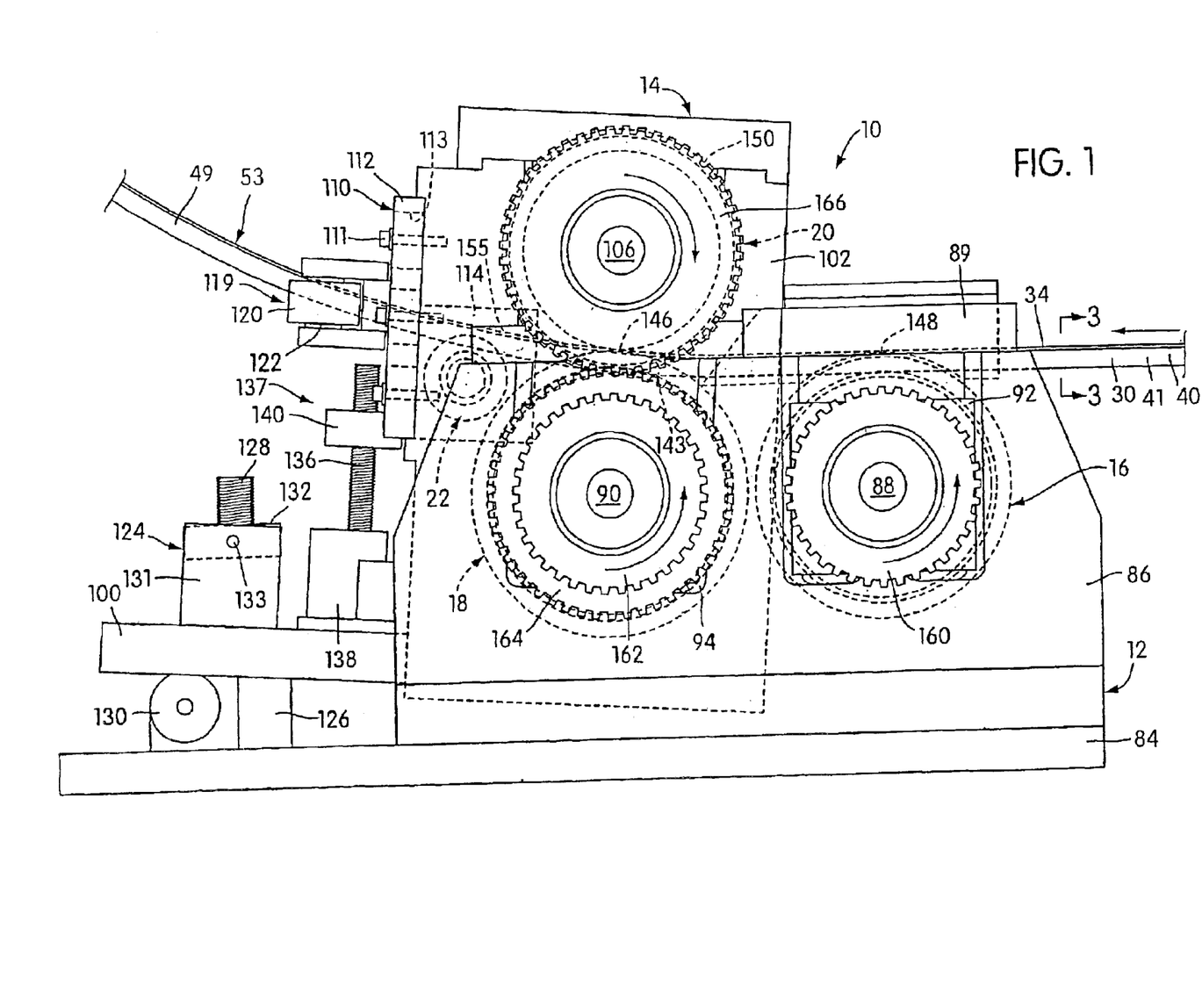
FIG. 1 shows a sweep forming assembly constructed according to the principles of the present invention and shows a fragmentary portion of a continuous strip bumper structure extending through the assembly.
Figure 2:
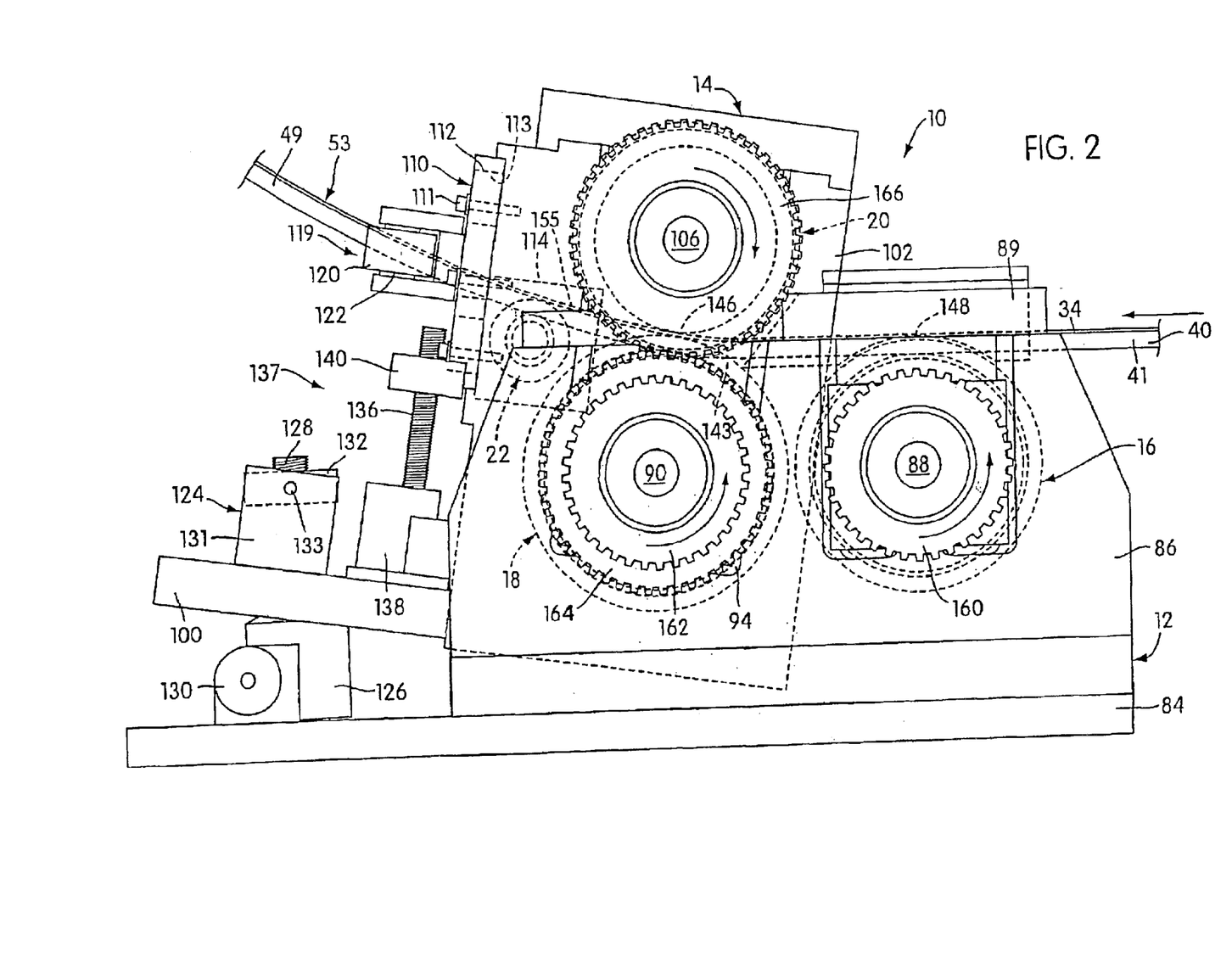
FIG. 2 shows a view of the sweep forming assembly FIG. 1 in a second adjusted operating position.

FIGS. 1–2 show a sweep forming assembly, generally designated 10, constructed according to the principles of the present invention. The sweep forming assembly 10 generally includes a base 12, a primary carriage assembly 14, a driven support member 16, first and second driven flexing rollers 18, 20 and an auxiliary roller 22.

A fragmentary portion of the bumper structure 53 is shown interengaged with the sweep forming assembly 10. The downstream direction in FIGS. 1 and 2 is from right to left, as indicated by a straight directional arrow on the right hand side of each of FIGS. 1 and 2 (spaced slightly above the initially shaped portion 41 of the bumper structure 53).

The driven support roller 16 and the first driven flexing roller 18 are mounted on the base 12 of the sweep forming assembly 10 for rotational movement with respect thereto. The base 12 is a metal structure, preferably made of steel, and includes a bottom plate 84 and a pair of upwardly extending, essentially vertical wall plates 86 fixed to the plate 84. The wall plates 86 are affixed to the plate 84 in transversely spaced, parallel relation to support the rollers 16, 18 and the primary carriage assembly 14 therebetween in a manner described below. The wall plates 86 are preferably reinforced by horizontally extending top plate fixed between upper portions of wall plates 86. The wall structure 89 is also preferably also made of steel.

The driven support roller 16 and the first flexing roller 18 are affixed to respective shafts 88, 90. Each end of the shaft 88 is rotatably mounted in a gear box 92 and each gear box 92 is, in turn, mounted in a respective wall plate 86 of the base 12. Similarly, each end of the shaft 88 is rotatably mounted in a gear box 94 and each gear box 94 is, in turn, mounted in a respective wall plate of the base 12. Thus, the shafts 88, 90 define the rotational axes of the respective rollers 16, 18.

The primary carriage assembly 14 is pivotally mounted generally between the wall plates 86 on the shaft 90 for pivotal movement with respect to the base 12. Thus, the axis of rotation of the first flexing roller 18 is coaxial with the pivot axis of the primary carriage assembly 14. The primary carriage assembly 14 is a metal structure, preferably made of steel and includes a carriage bottom plate 100 and a pair of wall plates 102 affixed to the carriage bottom plate 100. The wall plates 102 are affixed to the bottom plate 100 in transversely spaced, parallel relation and cooperate to support the second driven flexing roller 20 and portions of an auxiliary carriage assembly 110 therebetween.

The second flexing roller 20 is fixedly mounted on a shaft 106. The shaft 106 is rotatably mounted between the wall plates 102 of the primary carriage assembly 14.

As can be appreciated from a comparison of FIGS. 1 and 2, when the primary carriage assembly 14 is pivoted with respect to the base 12, the second flexing roller 20 moves with the primary carriage assembly 14 such that pivotal movement of the primary carriage assembly with respect to the base 12 causes pivotal movement of the second flexing roller 20 with respect to the first flexing roller 20 about the pivot axis defined by shaft 90. The inter-axial distance between the axes of rotation (defined by shafts 90, 106) of the first and second driven flexing rollers 18, 20 is a fixed distance in all positions of pivotal adjustment of the primary carriage assembly 14 with respect to the base 12.

Preferably, the rollers 16, 18, 20 are driven. Specifically, the first and second flexing rollers 18, 20 drive the bumper structure 53 in the downstream direction. The support roller 16 supports an upstream portion of the bumper structure to resist downward movement of the bumper structure 53 during the flexing operation. Driving the support roller 16 minimizes the resistance to the movement of the bumper structure 53 in the downstream direction.

Outer gears 160, 162 are affixed on respective shafts 88, 90 in driving relation to the associated rollers 16, 18. Each drive gear 160, 162 is engaged through a chain drive (not shown) or other appropriate structure with a source of mechanical power (not shown). Secondary drive gears 164, 166 are fixedly mounted on respective shafts 90, 106 so that driven movement of the outer gear 162 drives both secondary gears 164, 166 and thus both rollers 18, 20.

A primary carriage adjustment assembly 124 is operatively mounted between the base 12 and the primary carriage assembly 14 to pivot the primary carriage assembly 14 with respect to the base 12 and to hold the primary carriage assembly 14 in an adjusted operating position thereafter. The adjustment assembly 124 includes a housing 126 fixed to the bottom plate 84 of the base 12 and a lower portion of a vertically extending threaded shaft 128 is rotatably mounted in the housing 126. A control assembly 130 is operatively engaged with the threaded shaft 128 to control rotation of the threaded shaft 128 with respect to the housing 126.

The threaded shaft 128 extends through an opening in the bottom plate 100 of the primary carriage assembly 14 and between a pair of support wall plates 131 fixed to the bottom plate 100 on opposite transverse sides of the opening in the plate 100. A threaded member 132 is pivotally mounted between the wall plates 131 by pivot shafts 133. An upper end of the threaded shaft 128 threadedly engages the threaded member 132. Bidirectional rotation of the threaded shaft 128 causes bidirectional threaded movement of the threaded member 132 along the shaft 128. Threaded movement of threaded member 132 along the shaft 128 causes pivotal movement of the primary carriage assembly 14 with respect to the base 12. The threaded engagement between the shaft 128 and the threaded member 132 holds the primary carriage assembly 14 in an adjusted operating position with respect to the base 12 when rotational movement of the shaft 128 ceases.

The adjustment assembly 137 is operatively mounted between the primary carriage assembly 14 and the auxiliary carriage assembly 110 to control movement of the auxiliary carriage assembly with respect to the primary carriage assembly 14. Specifically, a lower end of a threaded shaft 136 is rotatably mounted in a housing 138 mounted on the bottom plate 100. An upper end of the threaded shaft 136 threadedly engages a threaded member 140 mounted to the mounting plate 112. Rotation of the threaded shaft 136 with a control assembly (not shown) causes sliding movement of the auxiliary carriage assembly 110 (through the range of movement provided by the slots 113 and bolts 111) with respect to the primary carriage assembly 14 to raise and lower the roller 22 with respect to the first and second flexing rollers 18, 20. Threaded engagement between the shaft 136 and the member 140 hold the auxiliary carriage assembly in an adjusted operating position with respect to the primary carriage assembly 14 after rotation of the shaft 136 ceases.

The auxiliary carriage assembly 110 is movably mounted on the primary carriage assembly 14, generally between the wall plates 102. The auxiliary carriage assembly 110 is a metal structure, preferably made of steel and includes an auxiliary mounting plate 112 and a pair of wall plates 114 affixed to the mounting plate 112. The wall plates 114 are affixed to the mounting plate 112 in transversely spaced, parallel relation and cooperate to rotatably support the auxiliary roller 22 therebetween.

The auxiliary carriage assembly 110 is mounted for relative movement with respect to the primary carriage assembly 14 by bolts 111 that extend through elongated slots 113 formed in the mounting plate 112 of the auxiliary carriage assembly 110. Specifically, a series of bolts 111 is mounted in each wall plate 102 of the primary carriage assembly 14, each bolt 111 extending through a slot 113. Movement of the auxiliary carriage assembly 110 with respect to the primary carriage assembly 14 provides relative movement of the auxiliary roller 22 with respect to the first and second flexing rollers 18, 20. The auxiliary carriage assembly 110 is moved with respect to the primary carriage assembly 14 and is held in an adjusted operating position with respect thereto by an adjustment assembly 137.

An optional exit roller assembly 119 which includes a pair of transversely spaced exit rollers 120 is mounted to the mounting plate 112 of the auxiliary carriage assembly 110. The exit rollers 120 are idler rollers that rotate about shafts 122. The exit rollers 120 support opposite transverse edges of the bumper structure 53 when the same is cut in the cut off press 45 which is preferably positioned immediately downstream of the sweep forming assembly 10 (see FIG. 7). The exit rollers 120 are thus not involved in the sweep forming operation but can be mounted on the assembly 10 as a convenience to the bumper manufacturer. Preferably the exit roller assembly 119 is movably mounted on the mounting plate 112 by bolts or other appropriate structure so that its position can be changed to accommodate a wide range of sweep curvatures.

The manner in which the pivotal position of the primary carriage assembly 14 with respect to the base 12 is adjusted can be understood from a comparison if FIGS. 1 and 2.

Operation

The sweep forming assembly 10 is constructed and arranged to receive at the position of exit 43 of a roll forming assembly 37 the initially shaped roll formed bumper structure 41 constructed of a metal material and having a predetermined roll formed transverse bumper cross section and a substantially straight longitudinal configuration and to impart a permanent bumper curvature to the bumper structure, thereby providing the finally shaped bumper structure 49 downstream of the sweep forming assembly 10.

The driven support roller 16 supports bumper structure 53 at the position of exit of the roll forming assembly 37. The first and second driven flexing rollers 18, 20 drive the bumper structure 53 in the downstream direction and are positioned downstream of the driven support roller 16 sufficiently close to flex the bumper structure 53 at a point of flexure 143 between the driven support roller 16 and the first and second driven flexing rollers 18,20.

Preferably, the support roller 16 and the first flexing roller 18 are mounted on the base 12 such that the uppermost point of an outer periphery 146 of the first flexing roller 18 is vertically higher than the line level. In the sweep forming assembly 10, the shafts 88, 90 are at the same vertical height. The vertical height differential between the peripheries 146, 148 is achieved by making the radius of the first flexing roller 18 greater than the radius of the support roller 16. Preferably the outer periphery 148 of the driven support roller 16 is at line level and the outer periphery 146 of the first flexing roller 18 is approximately 2.5 cm (one inch) above line level. Thus, the first flexing roller 18 provides a small amount of lift or deflection to the bumper structure 53 as it passes thereover.

Alternatively, the height differential between the outer peripheries 146, 148 can be achieved by having a support roller and a first flexing roller of equal radius and mounting the respective shafts on the base so that the shaft of the first flexing roller is vertically higher than the vertical height of the shaft of the driven support roller.

Generally, to provide sweep to the bumper structure 53, an assembly operator pivots or revolves the second flexing roller 20 in a flexing direction (clockwise from the point of view of FIGS. 1, 2, 15 and 16) using the control assembly 130 of the primary carriage adjustment assembly 124 as previously described. The pivotal movement of the primary carriage assembly 14 revolves the second flexing roller 20 about the pivot axis defined by shaft 90 with respect to the first flexing roller 18. FIG. 1 shows the second flexing roller 20 (and therefore the primary carriage assembly 14) in a first pivotal position with respect to the first flexing roller 18 and FIG. 2 shows the second flexing roller 20 in a second pivotal position with respect to the first flexing roller 18. As is considered in more detail below, FIGS. 15 and 16 also illustrate the pivotal movement of the second flexing roller 20 in the flexing direction with respect to the first flexing roller 18 and shows the rollers 16, 18 and 20 in isolation.

Pivotal or revolving movement of the second flexing roller 20 in the flexing direction exerts a force on the bumper structure which flexes the same at the point of flexure 143 between the first flexing rollers 18 and the support roller 16. As can be appreciated from a comparison of FIGS. 1 and 2 (and of 15 and 16), the greater the pivotal movement of the carriage assembly 14 in the flexing direction, the greater the degree of flexure and thus the greater the degree of permanent curvature imparted to the metal material of the bumper structure 53.

Figure 15:
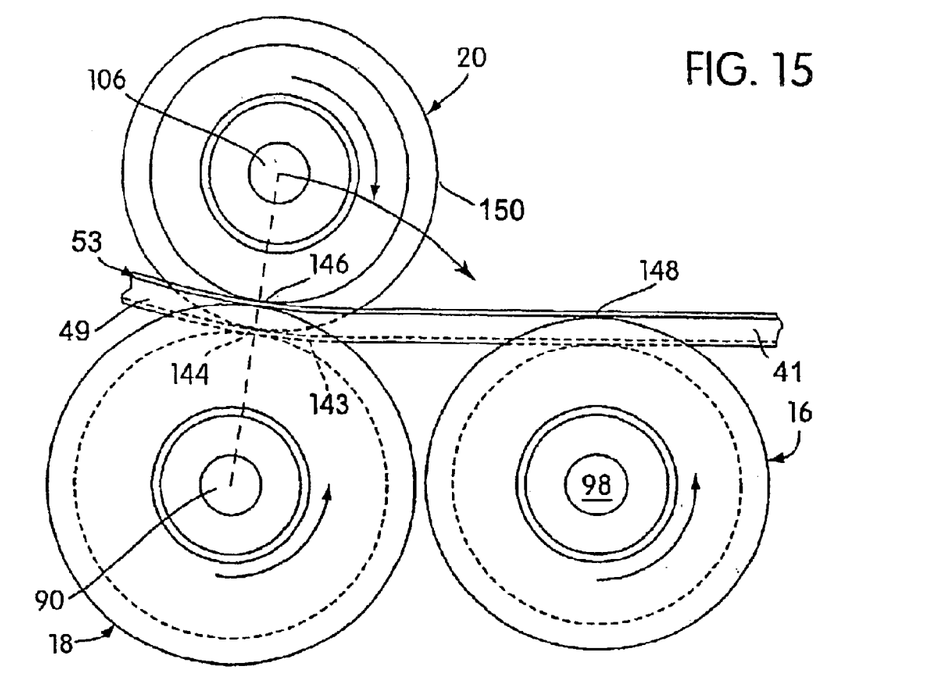
FIGS. 15 and 16 show two views of a plurality of roller members of the sweep forming assembly of FIG. 1 in isolation flexing a bumper structure at a point of flexure.
Figure 16:
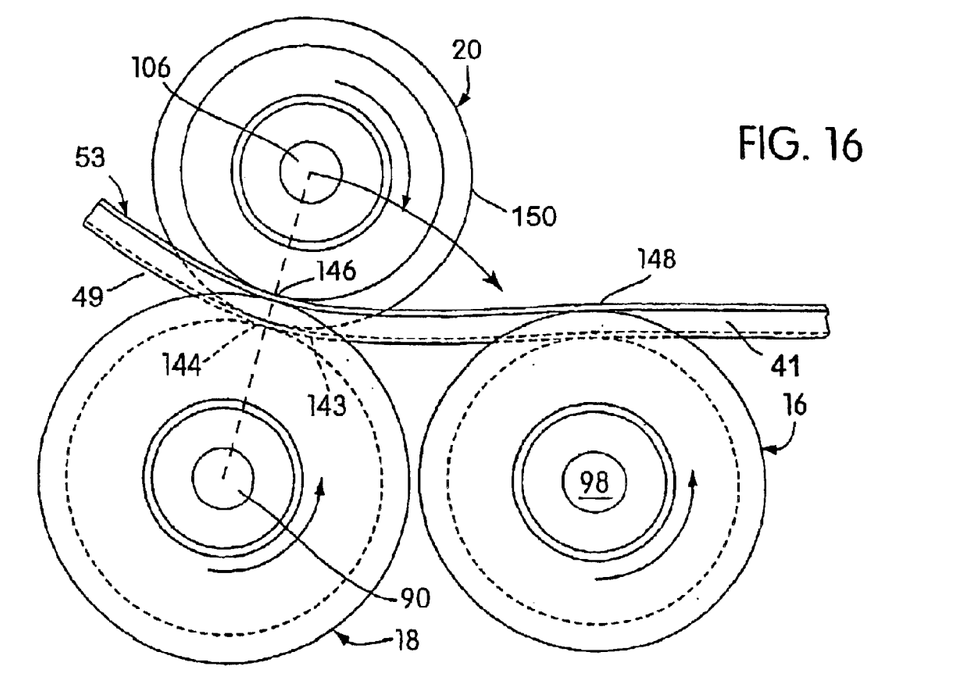

The flexing action of the bumper structure 53 at the point of flexure 143 can be best understood from a comparison of FIGS. 15 and 16 which shows the rollers 16, 18 and 20 in isolation. FIG. 15 shows the second flexing roller 20 in a first position of pivotal adjustment with respect to the first flexing roller 18 and FIG. 16 shows the second flexing roller 20 in a second position of adjustment after having been pivoted about the axis of rotation of the first flexing 18 in the flexing direction (indicated in FIGS. 15 and 16 by a directional arrow extending outwardly from the axis of rotation of the second flexing roller 20).

The flexing rollers 18, 20 are in driving engagement with the portion of the bumper structure 53 between their outer peripheries 146, 150. It can be understood that the portion of the bumper structure 53 that is between the peripheries 146, 150 of the flexing rollers 18, 20 at any moment is essentially tangent to the peripheries 146, 150 and is therefore essentially perpendicular to an imaginary line drawn between the axes of rotation defined by the shafts 90, 106 of the rollers 18, 20 (this imaginary line is represented by a dashed line in FIGS. 15 and 16). Movement of the second flexing roller 20 in the flexing direction moves the imaginary line in a clockwise direction about the axis defined by the shaft 90 and consequently shifts the point of driving engagement of the bumper structure and the outer peripheries 146, 150 of the driven flexing rollers 18, 20 in a clockwise direction about the outer periphery 146 of the first flexing roller 18. Thus, pivotal movement of the second flexing roller 20 changes the direction of travel of the portion of the bumper structure between the flexing rollers 18, 20 such that the greater the movement of the second flexing roller 20 in the flexing direction, the steeper the slope of the path traveled by the bumper structure between the peripheries 146, 150. The support roller 16 is close enough to the first flexing rollers 18 such that the bumper structure flexes at a point between therebetween in response to the pivotal or revolving movement of the second flexing roller 20 in the flexing direction.

It is now apparent to those skilled in the art that the support roller 16 must be positioned sufficiently close to the flexing rollers 18 to cause flexure of the metal material beyond the elastic limit thereof in response to the pivotal movement of the support roller 20. If the support roller 16 were positioned a relatively large distance from the flexing rollers 18, 20, movement of the second flexing roller 20 in the flexing direction would not generate a sufficient force to permanently curve the bumper structure, particularly when a high strength steel is used in the bumper structure construction.

If the support roller 16 were on one assembly or station and the first and second flexing rollers 18, 20 were on a second assembly or station, they would not be positioned close enough to flex the metal material a sufficient degree to impart a significant degree of permanent longitudinal curvature, particularly when a high strength metal is used to construct the bumper structure. It can also be understood that because the support roller 16 supports the portion of the bumper structure immediately upstream of the first and second flexing rollers in opposition to the flexing force exerted by the rollers 18, 20, it is usually not necessary that the support roller 16 be paired with an upper roller.

With reference again to FIGS. 15 and 16, it can be appreciated that the greater the clockwise movement of the second flexing roller about the pivot axis defined by shaft 90, the greater the degree of bumper structure flexure and therefore the greater the degree of permanent longitudinal curvature. Generally, the flexing rollers 18, 20 flex the metal material of the bumper structure 53 at a point 143 slightly upstream of the point of driving engagement between the bumper structure 53 and the flexing rollers 18, 20. It can be appreciated that the exact location of this point of flexure changes as the angular position of the support roller 18 with respect to the flexing roller 20 changes.

The sweep forming assembly 10 is configured to provide the bumper structure 53 with an inside sweep. Thus, the open cross section bumper structure 53 emerges from the exemplary roll forming assembly 37 in the orientation shown in FIG. 3 with the inside surface 42 facing upwardly. It can be understood that the bumper structure 53 could be rotated 180 degrees and the sweep forming assembly 10 reconfigured in a manner described below if it was desired to sweep the bumper structure 53 in the outside direction.

The outer peripheries of the rollers 16, 18, 20 and 22 are shaped to conform to the respective facing sides of the bumper structure 53. Specifically, the outer peripheries 146, 150 of the flexing rollers 18, 20 are of complementary male and female configuration and are essentially the same in profile as the roll forming rollers 39k and 39l of FIG. 14 and conform to the respective sides of the bumper structure 53 in surface-to-surface driving engagement therewith. As mentioned, the inter-axial distance between the shafts 90, 106 is fixed. Therefore, the radial distance between the outermost peripheries 146 and 150 of the first and second driven flexing rollers 18 and 20 is constant in all pivotal positions of adjustment of the second roller 20 with respect to the first flexing roller 18. Preferably this inter-periphery distance is approximately equal to the thickness of the metal of the bumper structure 53. Since the outer peripheries 146, 150 of the first and second flexing rollers 18, 20 conform to the associated sides of the bumper structure, the bumper structure can be flexed to a high degree by the action of the rollers 18, 20 without crushing or otherwise deforming the predetermined transverse bumper cross section during the sweeping forming operation. More particularly, the outer peripheries 146, 150 support the transverse cross section and protect it from being crushed or otherwise deformed during the flexing operation.

A high degree of bumper curvature can be imparted to a bumper structure 53 through angular adjustment of the second flexing roller 20 relative to the first flexing roller 18. The degree of curvature depends upon a number of factors, including the modulus of elasticity of the metal material of the bumper structure 53, the thickness of the metal material and the cross sectional configuration of the bumper structure. However, there may be a limit to the degree of curvature that can be imparted to a particular bumper structure using the flexing rollers, 18, 20 and the support roller 16. Excessive pivotal movement of the second flexing roller 20 in a flexing direction may nonetheless cause a tearing or uncontrolled puckering of the wall portions of the bumper structure 53. The side wall portions 38, 40 (see FIG. 3) are particularly susceptible to deformation or tearing during sweep forming.

The auxiliary roller 22 can be used to increase of the degree of sweep imparted to a bumper structure 53 beyond that which can be achieved using the rollers 16, 18, 20 alone. The auxiliary roller 22 is preferably an idler roller. The auxiliary roller 22 is positioned downstream of the first and second driven flexing rollers such that the portion of the bumper structure 53 driven downstream by the flexing rollers 18, 20 is driven into the auxiliary roller to bend the bumper structure 53 beyond the elastic limit of the metal material.

To increase the curvature of the bumper structure 53 using the auxiliary roller 22, the operator adjusts the position of the auxiliary carriage assembly 110 with respect to the primary carriage assembly 14 using the adjustment assembly 137 as aforesaid to move the roller 22 upwardly into engagement with the downwardly facing side of the bumper structure 53. FIG. 1 shows the auxiliary roller 22 spaced slightly below and thus out of engagement with the bumper structure 53. FIG. 2 shows the auxiliary roller 22 (and auxiliary carriage assembly 110) moved upwardly with respect to the primary carriage assembly 14 and shows the auxiliary roller 22 in engagement with the bumper structure 53.

The length 155 of the bumper structure 53 between the first and second flexing rollers 18, 20 and the auxiliary roller 22 is bent as the rollers 18, 20 drive the bumper structure 53 into the auxiliary roller 22. It has been found that this bending can impart an increased amount of sweep to a given bumper structure beyond that imparted by the flexing operation alone. Flexure imparted to the bumper structure 53 at the point of flexure 143 by the flexing rollers 18, 20 imparts a first degree of permanent curvature to the bumper structure 53 and the auxiliary roller 22 imparts a second degree of permanent curvature to the bumper structure 53.

An advantage of the sweep forming assembly 10 is that both carriage assemblies 14, 110 can be adjusted while the sweep forming assembly 10 is operating. Thus, the sweep forming assembly 10 can be adjusted "on-the-fly". This capability allows the operator to monitor the condition of the bumper structure 53 exiting from the sweep forming assembly 10 as the operator is adjusting the same.

If, for example, the second flexing roller 20 is pivoted too far in the flexing direction, thereby causing the wall portions of the particular bumper structure 53 to tear slightly or pucker uncontrollably before the desired degree of sweep is achieved, the operator can "back off" the second flexing roller 20 until no puckering and/or tearing is observed. The operator can then further increase the amount of imparted sweep by moving the auxiliary roller 22 in the sweep increasing direction to increase the degree of sweep.

It can be understood that because the operator is able adjust the positions of the rollers 20, 22 while the assembly 10 is operating, the operator is able to produce a wide range of settings on the sweep forming assembly 10. The flexing roller 20 and the auxiliary roller 22 can be thought of as the "coarse" and "fine" adjustments, respectively, of the sweep forming assembly 10. The adjusting procedure followed for a particular bumper structure can be varied to best impart sweep to the particular bumper structure.

Driving the rollers 16, 18, 20 allows a greater degree of bumper curvature to be imparted to the bumper structure 53 by the sweep forming assembly 10 compared to a sweep forming assembly with passive rollers because driving the bumper structure 53 prevents the same from buckling as it passes through the sweep forming assembly 10. Pushing the bumper structure in the downstream direction through the sweep forming assembly would tend to cause the bumper structure to buckle and buckling deforms the bumper structure, particularly the predetermined transverse bumper cross section. Driving the rollers 16, 18, 20 pulls the bumper structure 53 through the sweep forming assembly 10, thereby preventing buckling.

Figure 8:
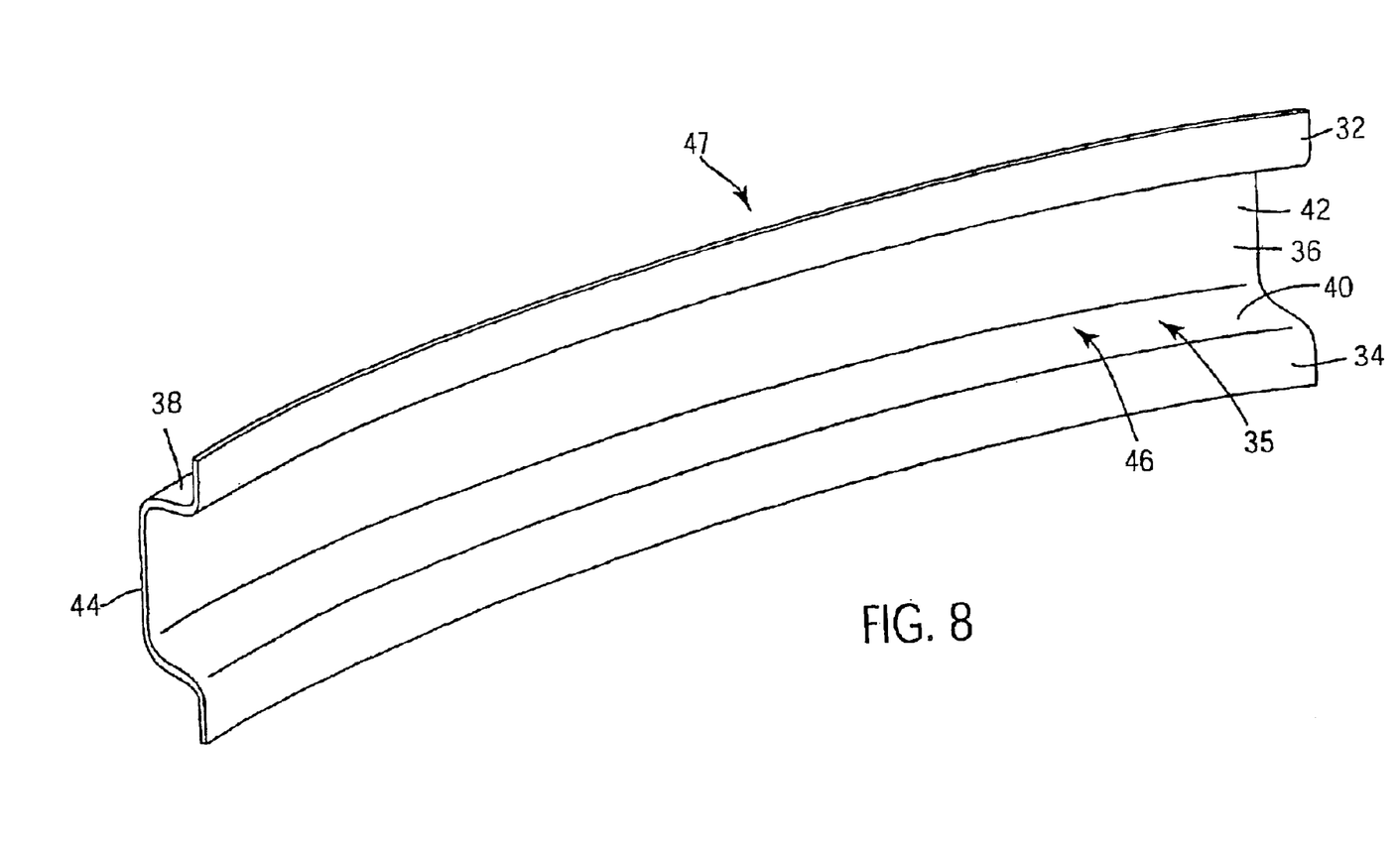
FIG. 8 is a perspective view of an exemplary individual bumper member.
Figure 9:
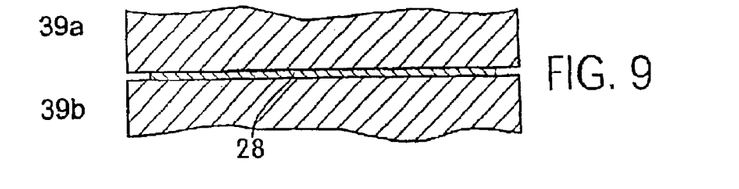
FIGS. 9–14 show in fragmentary cross section outer peripheries of a series of pairs of roll forming rollers of a roll forming assembly and a metal strip structure therebetween.
Figure 10:
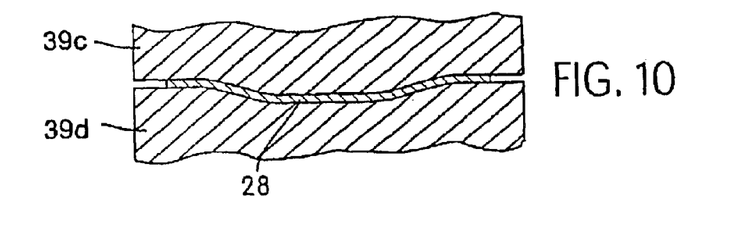
Figure 11:
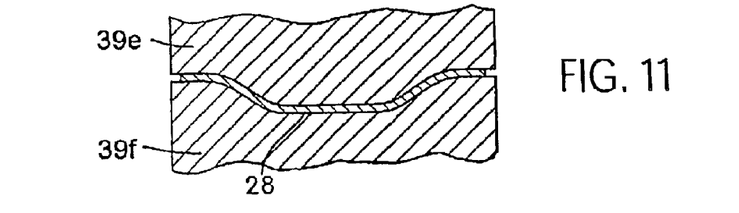
Figure 12:
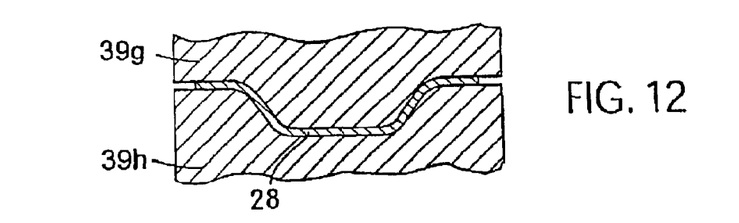
Figure 13:
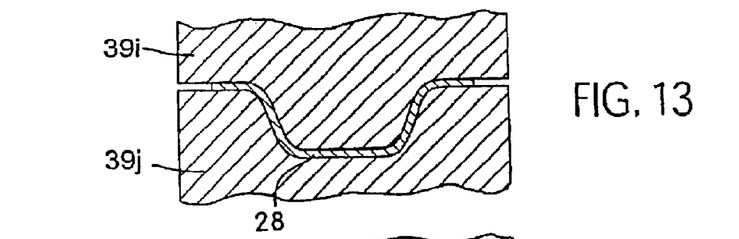
Figure 14:
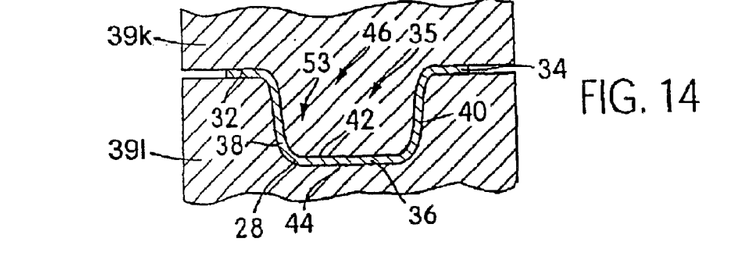

The sweep forming assembly 10 provides the initially shaped bumper structure 41 emerging from the position of exit 43 of the roll forming assembly 37 with the desired degree of permanent bumper curvature. As mentioned, after the initially shaped continuous bumper structure 41 is provided with the desired amount of sweep, the bumper structure 53 has achieved its final bumper shape. The bumper structure 53 is then cut into individual bumper members, one of which is shown in FIG. 8 and generally designated 47.

The individual bumper members can be used to provide vehicle bumpers. Alternatively, one (or more) bumper members can be mounted to a bumper mounting structure to close the one at least partially open side of each bumper member to form a bumper beam assembly having a closed cross section. The method of mounting one or more individual bumper members on a mounting structure to form a bumper beam assembly having a closed cross section is disclosed in the commonly assigned U.S. Patent Application Ser. No. 60/100,835 which application is hereby incorporated by reference into the present application for all material disclosed therein.

Figure 5:
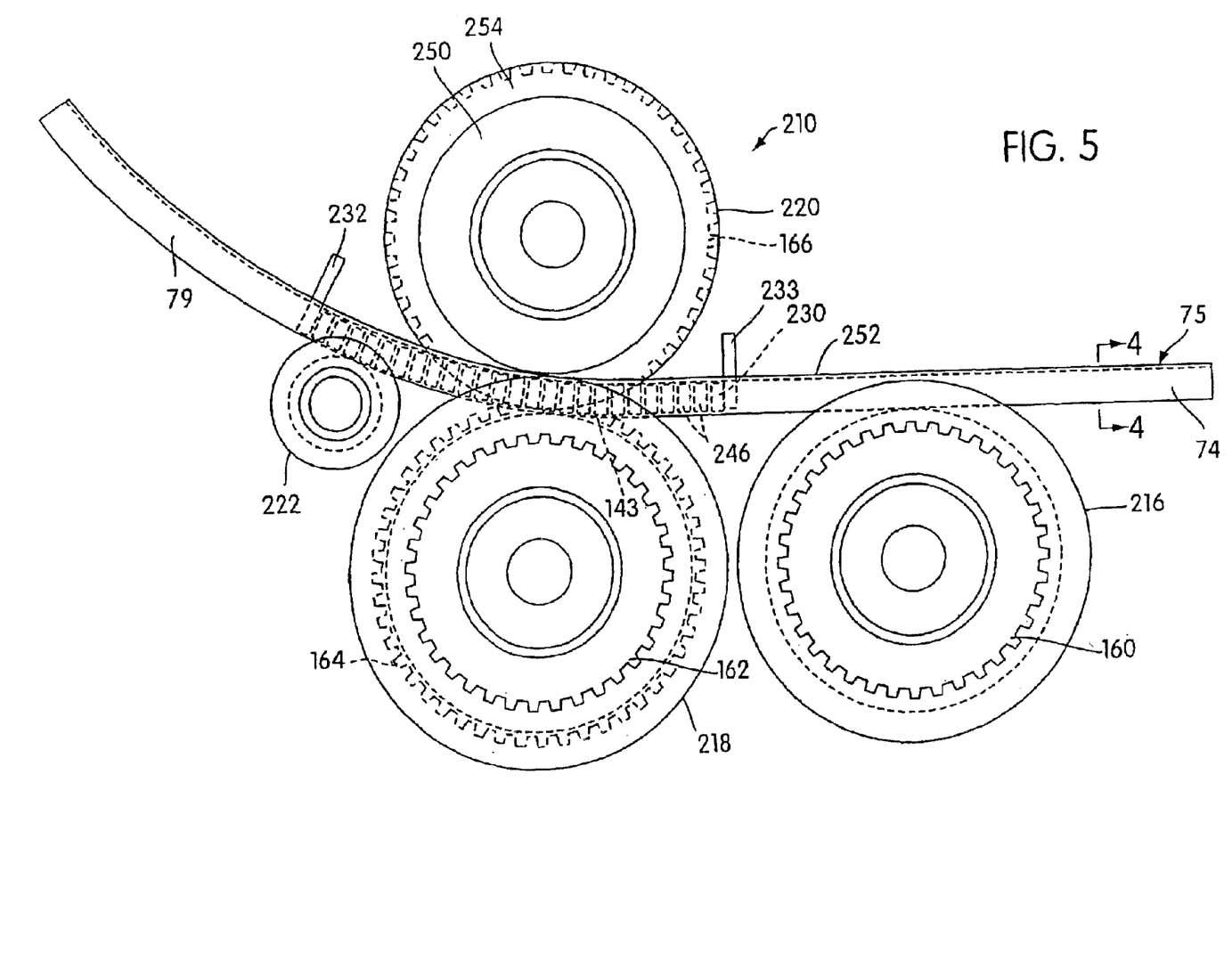
FIG. 5 shows a schematic view of a second embodiment of a sweep forming assembly of the present invention.
Figure 6:
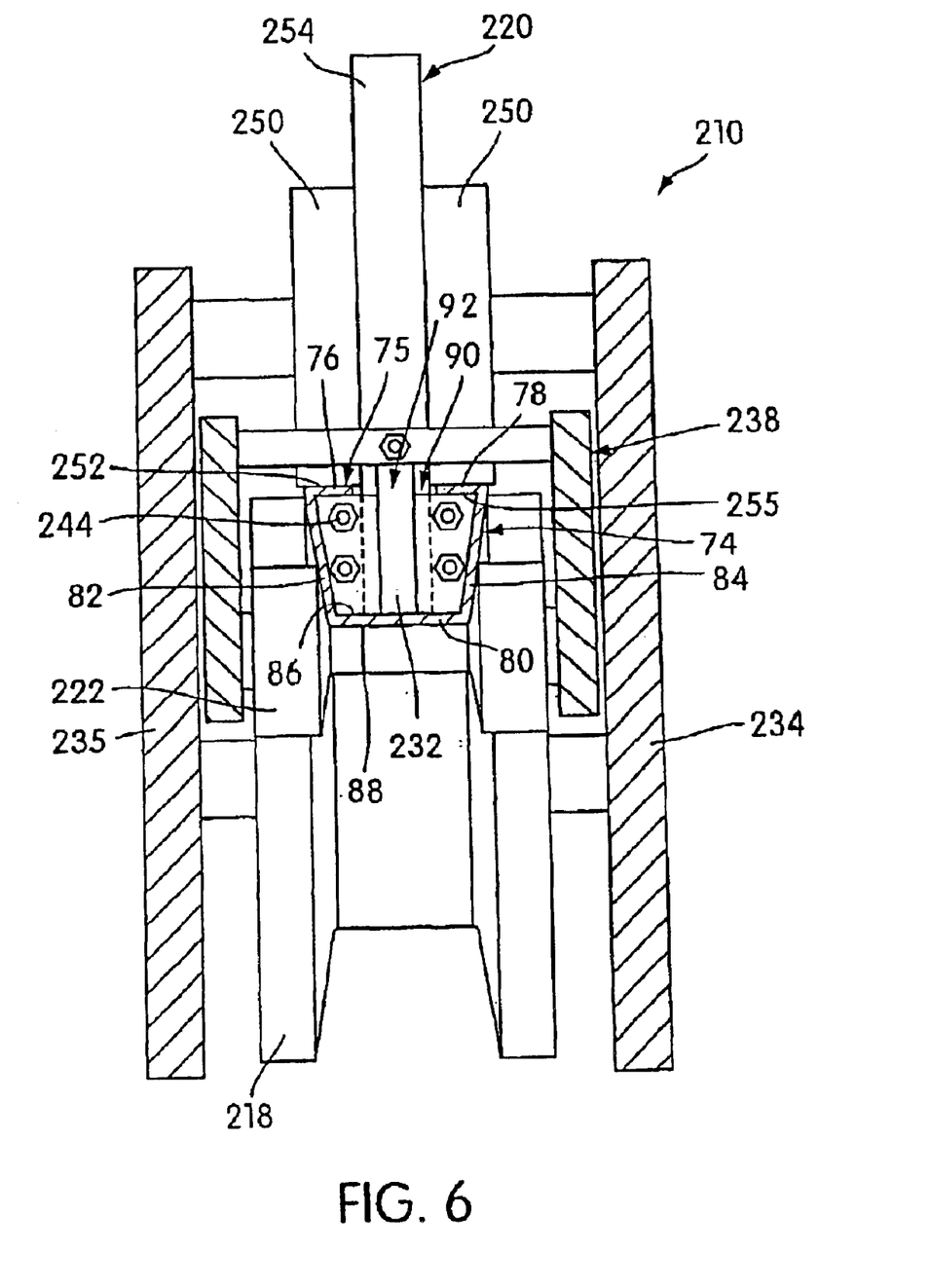
FIG. 6 shows a partial sectional end view of the sweep forming assembly of FIG. 5.

A sweep forming assembly for providing bumper sweep to an initially shaped bumper structure having a partially closed cross section is represented in FIGS. 5 and 6 and is generally designated 210. The construction and operation of sweep forming assembly 210 is similar to that of sweep forming assembly 10. The sweep forming assembly 210 is shown schematically in FIG. 5 to show the differences between the assemblies 10, 210 more clearly.

A driven support roller 216, a first and a second driven flexing roller 218, 220, respectively, and an auxiliary roller 222 of the assembly 210 are shown in isolation FIG. 5. The general structure and operation of the base, the primary carriage assembly, the auxiliary carriage assembly and associated structures of the sweep forming assembly 210 and the manner in which the rollers 216, 218, 220 and 222 are mounted on the same are essentially identical to that shown (see FIGS. 1 and 2) and described above for the sweep forming assembly 10. Consequently, the base, carriage assemblies and associated structures are omitted from the FIG. 5. Portions of the sweep forming assembly 210 that are identical to portions of the sweep forming assembly 10 are identified by identical reference numerals and are not described further. The gears 164, 166 are shown in dashed lines to more clearly show the structure of the associated rollers.

The main difference between the sweep forming assemblies 10, 210 is that when a bumper structure having a partially closed cross section (such as exemplary bumper structure 75 shown in FIG. 4) is sweep formed in the sweep forming assembly 210, a pair of snake arbors 230 are provided in the interior the bumper structure 75, one arbor 230 on each transverse side of the bumper structure. Opposite ends of the arbors 230 are secured to bracket members 232, 233 (fragments of which are shown in FIG. 5 and one of which is shown in FIG. 6) which extend through the opening 90 of the bumper structure 75. An upper end portion of the bracket member 232 is preferably secured to structure on the auxiliary carriage assembly 238 (shown in end view in FIG. 6). The bracket member 233 is preferably mounted to the base. Two pairs of tie rods 244 are secured between the brackets 232, 233 (one pair on each side of the bumper structure 75) and a series of blocks 246 are mounted on the rods.

FIG. 6 shows a partial view of the sweep forming assembly 210 looking into the exit of the assembly 210 in the upstream direction. The first flexing roller 218 engages substantially the entire outside surface of the bumper structure 75. The second flexing roller 220 includes lateral roller portions 250 of lesser radius which rollingly engage upper exterior edges 252 of the bumper structure 75 and a central roller portion 254 of greater radius which extends through the opening 90 in the predetermined cross section and engages a central portion of the surface 86 of the interior of the bumper structure 75. Thus, a snake arbor 230 extends on each side of the central portion 254 of the second flexing roller 220. The snake arbors 230 and brackets 232 slidingly engage inside surfaces of the bumper structure 75. Alternatively, the arbors 230 and/or the brackets 232 can be constructed to include a plurality of rollers (not shown) constructed and arranged to rollingly engage upwardly and downwardly facing interior surfaces 86 and 255, respectively, of the cross-section.

Each bumper structure is preferably formed from strips of raw sheet metal material, preferably steel. One preferred steel for use with the sweep forming assembly 10 is a martinsitic steel having a KSI of between approximately 190 (referred to as a martinsitic 190) to approximately 220 (referred to as a martinsitic 210) (or an MPa of between 1310 and 1516). These steels are readily commercially available and are referred to respectively by the trade names "Inland M190" and "Inland M220" steel. The martinsitic 190 and the martinsitic 220 are quenched and tempered steels characterized by minimum ultimate tensile strengths of 190,000 and 220,000 psi, respectively (1310 MPa and 1516 MPa, respectively). Both the martinsitic 190 and the martinsitic 220 have a grain structure comprised entirely of tempered martinsite.

Another preferred steel for use with the sweep forming assembly 10 is a dual-phase 140T quenched and tempered steel. This steel is readily commercially available and is referred to by the trade name "Inland Di-Form 140T" steel. The dual-phase 140T is characterized by a minimum ultimate tensile strength of 140,000 psi, (965 MPa) and has a grain structure comprised of ferrite and tempered martinsite.

Another preferred steel for use with the sweep forming assembly 10 is a High Strength Low Alloy (HSLA) 120XF steel. Although this steel is referred to as "High Strength Low Alloy", it is not actually one of the High Strength Low Alloy grades; it is referred to as being "High Strength Low Alloy", however, because it is manufactured by a similar process. The HSLA 120XF is characterized by a minimum 0.2% offset yield strength of 120,000 psi (827 MPa) and has an entirely ferritic grain structure. This steel is readily commercially available and is referred to by the trade name "LTV 120 XF steel".

These steels are preferably used to manufacture individual bumper members that each have a uniform steel wall thickness. Preferably the bumper members are constructed of a steel having a strength of at least approximately 120 KSI (827 MPa) and more preferably are constructed of a steel having a strength greater than about 180 KSI (1240 MPa).

For example, a bumper can be constructed of a roll formed metal material by providing an elongated roll formed bumper member having a predetermined transverse bumper cross section and a longitudinal extent, the predetermined transverse bumper cross section having one at least partially open side, and the longitudinal extent having a predetermined bumper curvature of from about zero to about eighty and the metal material having a KSI of at least 120 (827 MPa). Preferably, the metal material is a steel that has a minimum 0.2 percent offset yield strength of about 120,000 psi (827 MPa) and an entirely ferritic grain structure. More preferably, the metal material is a quenched and tempered steel having a minimum ultimate tensile strength of about 140,000 psi (965 MPa) and a grain structure comprised of ferrite and tempered martinsite. Most preferably, the metal material is a quenched and tempered steel having a minimum ultimate tensile strength of from about 190,000 to about 220,000 psi (from about 1310 MPa to about 1516 MPa) and having an entirely tempered martinsite grain structure. When a steel having a strength of at least approximately 180 KSI (1240 Mpa) is used in the construction, the preferred steel wall thickness of the bumper member is within the range of from about 0.8 mm to about 1.6 mm, and is more preferably within the range of from about 1.0 mm to about 1.3 mm. When a steel having a KSI of approximately 120 to approximately 180 (827 to 1240 MPa) is used in the construction, the wall thickness of each bumper member is preferably approximately 2.0 mm.

The sweep forming assemblies 10, 210 can be constructed and operated to provide a wide range of inside or outside bumper sweep to initially shaped bumper structures constructed of a wide range of metal materials having a wide range of bumper cross sections. It is within the scope of the invention to produce a bumper member constructed of any of the metal materials described herein having either an open or closed cross section and having a bumper sweep of up to 80 or higher.

It can be appreciated that the description of the construction and operation of the sweep forming assembly is exemplary only, and not intended to limit the scope of the invention. For example, a sweep forming assembly can be constructed according to the principles of the present invention which provides inside or outside bumper sweep of over 80. Embodiments are contemplated and have been constructed which provide sweep as high as approximately 155.

It is also within the scope of the present invention to provide a driven mating roller vertically spaced above the driven support roller 16 when relatively high degrees of sweep (above approximately 80, for example) are being provided to an initially shaped bumper structure, or when the thickness of the metal material is relatively high or both. It has been found that the additional roller provides greater stability to the bumper structure during the sweep forming operation.

Similarly, the description of the metal materials used in bumper construction and the descriptions of bumper construction are intended to illustrate the invention and are not intended to limit the scope of the invention. Materials having properties outside the ranges described herein are also contemplated to be used in bumper construction. For example, steel having a hardness below 120 (827 Mpa) can be swept on a sweep forming assembly constructed according to the principles described herein.

Similarly, the bumper cross sections described and illustrated are exemplary and are intended to illustrate general types of cross sections and not to limit the range of bumper structures that can be swept using the sweep forming assembly or to limit the bumper members constructed according to the principles of the present invention to members having specific cross sections.

While the invention has been disclosed and described with reference with a limited number of embodiments, it will be apparent that variations and modifications may be made thereto without departure from the scope of the invention. Therefore, the following claims are intended to cover all such modifications, variations, and equivalents thereof in accordance with the principles and advantages noted herein.

What is claimed is:

1. A method for producing a roll formed bumper comprising of a metal material and having a predetermined transverse cross section and a predetermined curvature, said method comprising:

feeding a bumper structure into a forming assembly along a line level, said bumper structure having said predetermined transverse cross section and an essentially straight longitudinal configuration, said forming assembly comprising a driven support roller and a pair of driven cooperating flexing rollers, a first roller of said pair of flexing rollers positioned to deflect said bumper structure out of said line level and a second roller of said pair of flexing rollers mounted to revolve about said first roller, simultaneously driving said support roller and counter-rotating said pair of cooperating flexing rollers for feeding said bumper structure between said pair of cooperating flexing rollers, and revolving said second flexing roller about said first flexing roller to flex said bumper structure between said support roller and said first flexing roller thereby imparting a permanent longitudinal curvature to the bumper structure.

2. A method as claimed in claim 1 wherein by varying a degree of revolving of said revolving step, the permanent curvature imparted to said bumper structure is responsively varied.

3. A method as claimed in claim 2 wherein said permanent longitudinal curvature is said predetermined curvature.

4. A method for producing a roll formed bumper comprising of a metal material and having a predetermined transverse cross section and a predetermined curvature, said method comprising:

feeding a bumper structure into a forming assembly along a line level, said bumper structure having said predetermined transverse cross section and an essentially straight longitudinal configuration, said forming assembly comprising a driven support roller and a pair of driven cooperating flexing rollers, a first roller of said pair of flexing rollers positioned to deflect said bumper structure out of said line level and a second roller of said pair of flexing rollers mounted to revolve about said first roller, simultaneously driving said support roller and counter-rotating said pair of cooperating flexing rollers for feeding said bumper structure between said pair of cooperating flexing rollers, and revolving said second flexing roller about said first flexing roller to flex said bumper structure between said support roller and said first flexing roller thereby imparting a permanent longitudinal curvature to the bumper structure, wherein by varying a degree of revolving of said revolving step, the permanent curvature imparted to said bumper structure is responsively varied, and wherein said forming assembly further comprises an auxiliary roller, said auxiliary roller being positionable to engage said bumper structure as said bumper structure exits from between said pair of cooperating rollers, said method further comprising a step of moving said auxiliary roller relative to said first flexing roller to flex said bumper structure about said second flexing roller thereby imparting a further permanent longitudinal curvature to said bumper.

5. A method as claimed in claim 4 wherein said further permanent longitudinal curvature is said predetermined curvature.

6. A method as claimed in claim 5 wherein said method further comprises a step of cutting said bumper structure to a desired length providing a plurality of bumper members having said predetermined curvature.

7. A sweep forming assembly comprising:

a driven support roller positioned to receive a strip bumper structure at a line level; and a driven first flexing roller positioned to deflect said bumper structure from said line level and a driven second flexing roller cooperating with said first flexing roller for counter rotating therewith, said second flexing roller movably mounted to revolve about said first flexing roller, and an adjustment assembly operably engaging said second flexing roller to effect said revolving movement of said second flexing roller about said first flexing roller, said revolving movement effecting engagement of said second flexing roller with said bumper structure between said support roller and said first flexing roller and urging said bumper structure thereagainst imparting a permanent longitudinal curvature to the bumper structure.

8. A sweep forming assembly comprising:

a driven support roller positioned to receive a strip bumper structure at a line level;

a driven first flexing roller positioned to deflect said bumper structure from said line level and driven second flexing roller cooperating with said first flexing roller for counter rotating therewith, said second flexing roller movably mounted to revolve about said first flexing roller, an adjustment assembly operably engaging said second flexing roller to effect said revolving movement of said second flexing roller about said first flexing roller, said revolving movement effecting engagement of said second flexing roller with said bumper structure between said support roller and said first flexing roller and urging said bumper structure thereagainst imparting a permanent longitudinal curvature to the bumper structure, and an auxiliary roller movably mounted to move relative to said first flexing roller and an auxiliary adjustment assembly operably engaging said auxiliary roller to effect said relative movement, said relative movement effecting engagement of said auxiliary roller with said bumper structure to urge the bumper structure about said second flexing roller imparting a further longitudinal curvature to the bumper structure.

9. A sweep forming apparatus as claimed in claim 8 wherein said rollers are complementarily shaped to engage said bumper structure in a face to face relationship.

10. A sweep forming apparatus as claimed in claim 9 wherein said apparatus further comprises an arbor engaging and supporting an interior of said bumper structure.

* * * * *